United States Patent
Jang

(10) Patent No.: US 9,589,351 B2
(45) Date of Patent: Mar. 7, 2017

(54) SYSTEM AND METHOD FOR PET FACE DETECTION

(71) Applicant: Visage The Global Pet Recognition Company Inc., Vancouver (CA)

(72) Inventor: Daesik Jang, Vancouver (CA)

(*) Notice: Subject to any disclaimer, the term of this patent is extended or adjusted under 35 U.S.C. 154(b) by 0 days.

(21) Appl. No.: 14/849,207

(22) Filed: Sep. 9, 2015

(65) Prior Publication Data

US 2016/0070989 A1 Mar. 10, 2016

Related U.S. Application Data

(60) Provisional application No. 62/048,699, filed on Sep. 10, 2014.

(51) Int. Cl.
| | | |
|---|---|---|
| *G06K 9/00* | (2006.01) | |
| *G06T 7/00* | (2006.01) | |
| *G06K 9/62* | (2006.01) | |
| *G06K 9/68* | (2006.01) | |

(52) U.S. Cl.
CPC .......... *G06T 7/003* (2013.01); *G06K 9/00295* (2013.01); *G06K 9/6257* (2013.01); *G06K 9/6807* (2013.01)

(58) Field of Classification Search
None
See application file for complete search history.

(56) References Cited

U.S. PATENT DOCUMENTS

| | | | | |
|---|---|---|---|---|
| 8,660,317 | B2* | 2/2014 | Li | G06K 9/00228 382/115 |
| 2002/0102024 | A1* | 8/2002 | Jones | G06K 9/6256 382/225 |
| 2003/0108244 | A1* | 6/2003 | Li | G06K 9/00228 382/227 |
| 2006/0251338 | A1* | 11/2006 | Gokturk | G06F 17/30253 382/305 |
| 2011/0188713 | A1* | 8/2011 | Chin | G06F 17/30247 382/118 |
| 2012/0120283 | A1* | 5/2012 | Capata | G06K 9/00255 348/241 |

* cited by examiner

*Primary Examiner* — Shervin Nakhjavan

(57) ABSTRACT

Pet faces can be detected within an image using a cascaded adaboost classifier trained to identify pet faces with a high detection rate and a high false positive rate. The identified potential windows are further processed by a number of category aware cascade classifiers, which are each trained to identify pet faces of a particular category with a high detection rate and low false positive rate. The potential pet faces identified by the category aware classifiers may be processed to verify whether a pet's face is present or not.

20 Claims, 14 Drawing Sheets

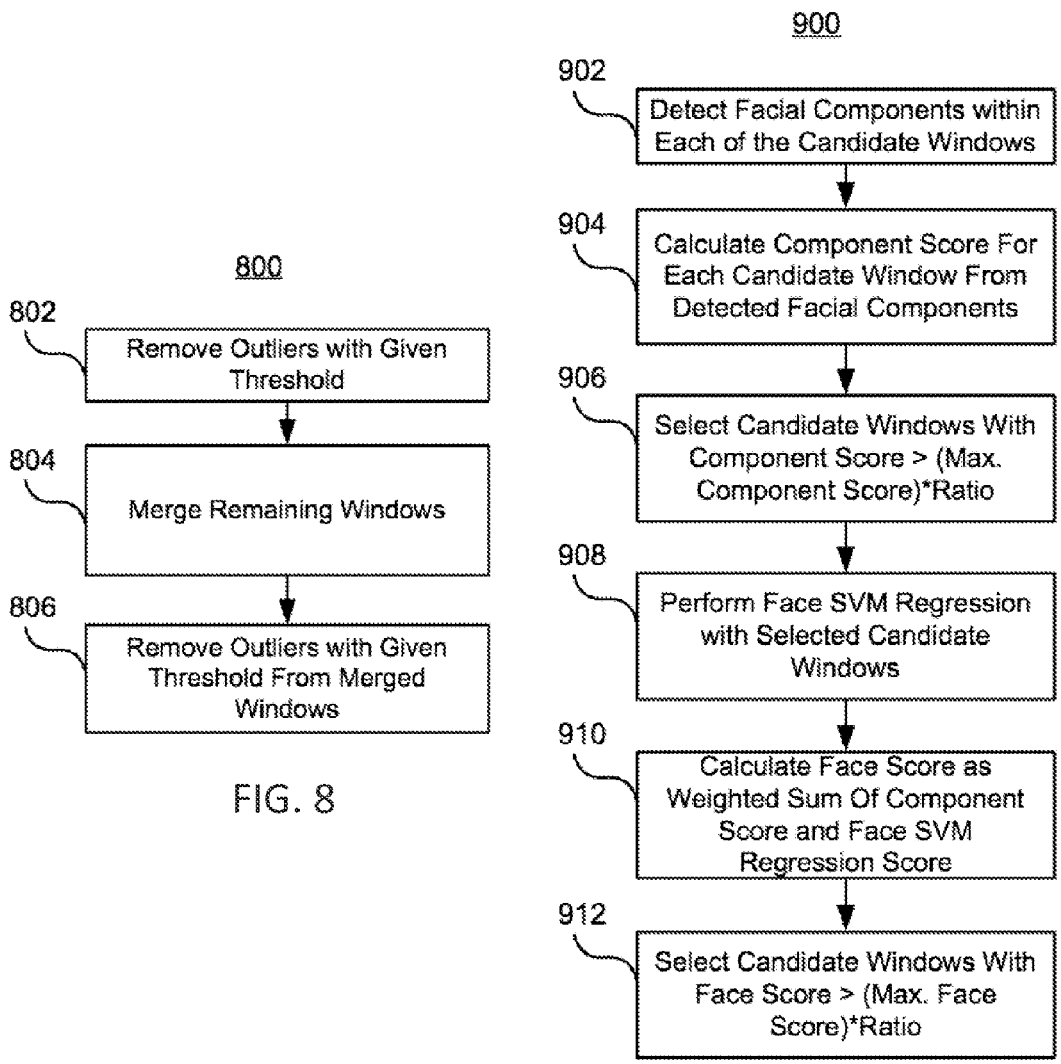

SYSTEM AND METHOD FOR PET FACE DETECTION

TECHNICAL FIELD

The current disclosure relates to object detection within images, and in particular to detecting the presence and location of pet faces in an image.

BACKGROUND

Processing of images to detect objects has numerous applications. One such application is the detection of human faces within an image. Once a face is located in an image, other processing may be applied, such as facial recognition or movement tracking.

Various algorithms have been developed for tracking objects, including the detection of human faces within an image. However, these techniques do not work well when attempting to detect faces of pets, such as dogs, within images. Conventional face detection algorithms have difficulty generating a classifier that can detect the presence of pet faces across the whole range of facial patterns across different pet breeds. For example, pets such as dogs have very high diversity in visual patterns across breeds.

SUMMARY

It would be desirable to be able to detect a pet's face within an image. A system and method for the detection of faces of pets with high diversity among the visual characteristics are described further herein.

Images are first analyzed coarsely to identify windows in the image that potentially include a pet's face, including the deliberate identification of false-positives. Next, the number of windows is reduced by analyzing them for specific breeds, or groups of breeds with similar faces. A different process is used for each breed, or group of breeds. The number of windows may be further reduced in number by merging overlapping windows and/or removing outliers. These windows are then verified as to whether they include a pet's face, for example by determining that individual facial features such as eyes, nose and a mouth are present in the window.

In accordance with the present disclosure there is provided a method of detecting a pet's face in an image comprising: receiving an image with one or more pet faces; processing the received image using a coarse cascade classifier trained to detect pet faces with a high detection rate and high false positive rate, the coarse cascade classifier identifying a plurality of potential pet face location windows within the received image; processing the plurality of potential pet face location windows to determine if a pet face is present, the processing of the plurality of potential pet face location windows comprising: processing each of the plurality of potential pet face location windows with a first of a plurality of category-aware cascade classifiers trained on a set of pet images each associated with a first category, the processing by the first category-aware cascade classifier identifying zero or more of the plurality of potential face location windows as having a pet face present; and processing each of the potential pet face location windows not identified as having a pet face present with a second category-aware classifier trained on a second set of pet images associated with a second category, the processing by the second category-aware cascade classifier identifying zero or more of the potential face location windows as having a pet face present; and verifying the presence of a pet face in each of the potential pet face location windows identified as having a pet face present.

In accordance with a further embodiment, the method further comprises removing outliers of the potential pet face location windows prior to verifying the presence of a pet face in the respective potential pet face location window.

In accordance with a further embodiment, the method further comprises merging significantly overlapping potential pet face location windows prior to verifying the presence of a pet face in the respective potential pet face location window.

In accordance with a further embodiment, outliers are identified using a predefined threshold for a weighted sum of errors.

In accordance with a further embodiment, the presence of a pet face in each of the potential pet face location windows identified as having a pet face present is verified based on the category associated with the category-aware cascade classifiers used to identify the potential pet face location windows.

In accordance with a further embodiment, the presence of a pet face in each of the potential pet face location windows identified as having a pet face present is verified by: identifying facial components within the potential pet face location windows using a cascade classifier trained to identify facial components; scoring a matching quality of each identified facial components; determining an adaptive verification threshold based on a maximum matching quality score of respective potential pet face location windows multiplied by a weighting ratio; and determining identified facial components having a matching quality score above the adaptive verification threshold.

In accordance with a further embodiment, the method further comprises verifying the presence of a pet face in each of the potential pet face location windows using support vector machine (SVM) regression.

In accordance with a further embodiment, the method further comprises determining a final matching score for identified facial components based on the SVM regression and the matching quality score.

In accordance with a further embodiment, the presence of a pet face in each of the potential pet face location windows identified as having a pet face present is verified using support vector machine (SVM) regression.

In accordance with a further embodiment, the method further comprises: training the coarse cascade classifier on a set of training images comprising a plurality of images containing pet faces associated with respective categories and images containing no pet faces.

In accordance with a further embodiment, the coarse cascade classifier is trained using a cascaded adaboost algorithm in order to provide the high detection rate and high false positive rate.

In accordance with a further embodiment, the first and second category aware cascade classifiers are iteratively trained based on a modified cascaded adaboost algorithm using training images associated with the first and second categories respectively.

In accordance with a further embodiment, the modified cascaded adaboost algorithm determines a threshold of a stage so that a detection rate of one of the categories satisfies a target detection rate.

In accordance with a further embodiment, a category with the highest detection rate is selected as the category for a category aware classifier currently being trained.

In accordance with a further embodiment, the plurality of potential pet face location windows are processed by a multiple cascade classifier comprising the first category aware cascade classifier and the second category aware cascade classifier.

In accordance with a further embodiment, one or more additional category aware cascade classifiers, each trained on a set of pet images associated with a respective category, are further used to process the plurality of potential pet face location windows.

In accordance with the present disclosure there is provided a system for detecting a pet's face in an image comprising: a processing unit for executing instructions; a memory unit for storing instructions, which when executed by the processing unit configure the system to: receive an image with one or more pet faces; process the received image using a coarse cascade classifier trained to detect pet faces with a high detection rate and high false positive rate, the coarse cascade classifier identifying a plurality of potential pet face location windows within the received image; process the plurality of potential pet face location windows to determine if a pet face is present, the processing of the plurality of potential pet face location windows comprising: processing each of the plurality of potential pet face location windows with a first of a plurality of category-aware cascade classifiers trained on a set of pet images each associated with a first category, the processing by the first category-aware cascade classifier identifying zero or more of the plurality of potential face location windows as having a pet face present; and processing each of the potential pet face location windows not identified as having a pet face present with a second category-aware classifier trained on a second set of pet images associated with a second category, the processing by the second category-aware cascade classifier identifying zero or more of the potential face location windows as having a pet face present; and verify the presence of a pet face in each of the potential pet face location windows identified as having a pet face present.

In accordance with a further embodiment, the instructions further configure the system to remove outliers of the potential pet face location windows prior to verifying the presence of a pet face in the respective potential pet face location window.

In accordance with a further embodiment, the instructions further configure the system to merge significantly overlapping potential pet face location windows prior to verifying the presence of a pet face in the respective potential pet face location window.

In accordance with a further embodiment, wherein outliers are identified using a predefined threshold for a weighted sum of errors.

In accordance with a further embodiment, the presence of a pet face in each of the potential pet face location windows identified as having a pet face present is verified based on the category associated with the category-aware cascade classifiers used to identify the potential pet face location windows.

In accordance with a further embodiment, the presence of a pet face in each of the potential pet face location windows identified as having a pet face present is verified by: identifying facial components within the potential pet face location windows using a cascade classifier trained to identify facial components; scoring a matching quality of each identified facial components; determining an adaptive verification threshold based on a maximum matching quality score of respective potential pet face location windows multiplied by a weighting ratio; and determining identified facial components having a matching quality score above the adaptive verification threshold.

In accordance with a further embodiment, the instructions further configure the system to verify the presence of a pet face in each of the potential pet face location windows using support vector machine (SVM) regression.

In accordance with a further embodiment, the instructions further configure the system to determine a final matching score for identified facial components based on the SVM regression and the matching quality score.

In accordance with a further embodiment, the presence of a pet face in each of the potential pet face location windows identified as having a pet face present is verified using support vector machine (SVM) regression.

In accordance with a further embodiment, the instructions further configure the system to: train the coarse cascade classifier on a set of training images comprising a plurality of images containing pet faces associated with respective categories and images containing no pet faces.

In accordance with a further embodiment, the coarse cascade classifier is trained using a cascaded adaboost algorithm in order to provide the high detection rate and high false positive rate.

In accordance with a further embodiment, the first and second category aware cascade classifiers are iteratively trained based on a modified cascaded adaboost algorithm using training images associated with the first and second categories respectively.

In accordance with a further embodiment, the modified cascaded adaboost algorithm determines a threshold of a stage so that a detection rate of one of the categories satisfies a target detection rate.

In accordance with a further embodiment, a category with the highest detection rate is selected as the category for a category aware classifier currently being trained.

In accordance with a further embodiment, the plurality of potential pet face location windows are processed by a multiple cascade classifier comprising the first category aware cascade classifier and the second category aware cascade classifier.

In accordance with a further embodiment, one or more additional category aware cascade classifiers, each trained on a set of pet images associated with a respective category, are further used to process the plurality of potential pet face location windows.

In accordance with the present disclosure there is provided a non-transitory computer readable medium storing instructions for execution by a processor to configure a system to: receive an image with one or more pet faces; process the received image using a coarse cascade classifier trained to detect pet faces with a high detection rate and high false positive rate, the coarse cascade classifier identifying a plurality of potential pet face location windows within the received image; process the plurality of potential pet face location windows to determine if a pet face is present, the processing of the plurality of potential pet face location windows comprising: processing each of the plurality of potential pet face location windows with a first of a plurality of category-aware cascade classifiers trained on a set of pet images each associated with a first category, the processing by the first category-aware cascade classifier identifying zero or more of the plurality of potential face location windows as having a pet face present; and processing each of the potential pet face location windows not identified as having a pet face present with a second category-aware classifier trained on a second set of pet images associated with a second category, the processing by the second category-aware cascade classifier identifying zero or more of the potential face location windows as having a pet face present; and verify the presence of a pet face in each of the potential pet face location windows identified as having a pet face present.

BRIEF DESCRIPTION OF THE DRAWINGS

Embodiments are described herein with references to the appended drawings, in which:

FIG. 8 depicts a method of post processing potential windows;

FIG. 9 depicts a method of verifying the presence of facial components within a window;

DETAILED DESCRIPTION

Glossary

Adaboost (Adaptive Boosting) Algorithm—a machine-learning algorithm that effectively improves the performance of weaker algorithms. The output of the other learning algorithms is combined into a weighted sum. It is adaptive in that subsequent weak learners are tweaked based on misclassifications made by previous classifiers.

Category—refers to a breed or a group of breeds having similar facial features

Classifier—an image analysis machine that analyzes features of objects in the images to determine what class or group the object belongs in.

Cascade Classifier—a multi-stage classifier, where the output from one classifier is used as additional information for the subsequent classifier.

Category Aware Cascade Classifier—a cascade classifier that is optimized for a particular category of pet.

Global or Coarse Cascade Classifier—the classifier disclosed herein that generates possible locations of pet faces with a high false-positive rate.

Stage Classifier—one of several parts of a cascade classifier.

SVM (Support Vector Machine)—supervised learning models that analyze data and recognize patterns, used for classification and regression analysis. Given a set of training examples that belong to one of two categories, an SVM training algorithm builds a model that assigns new examples into one category or the other.

Figure 1:
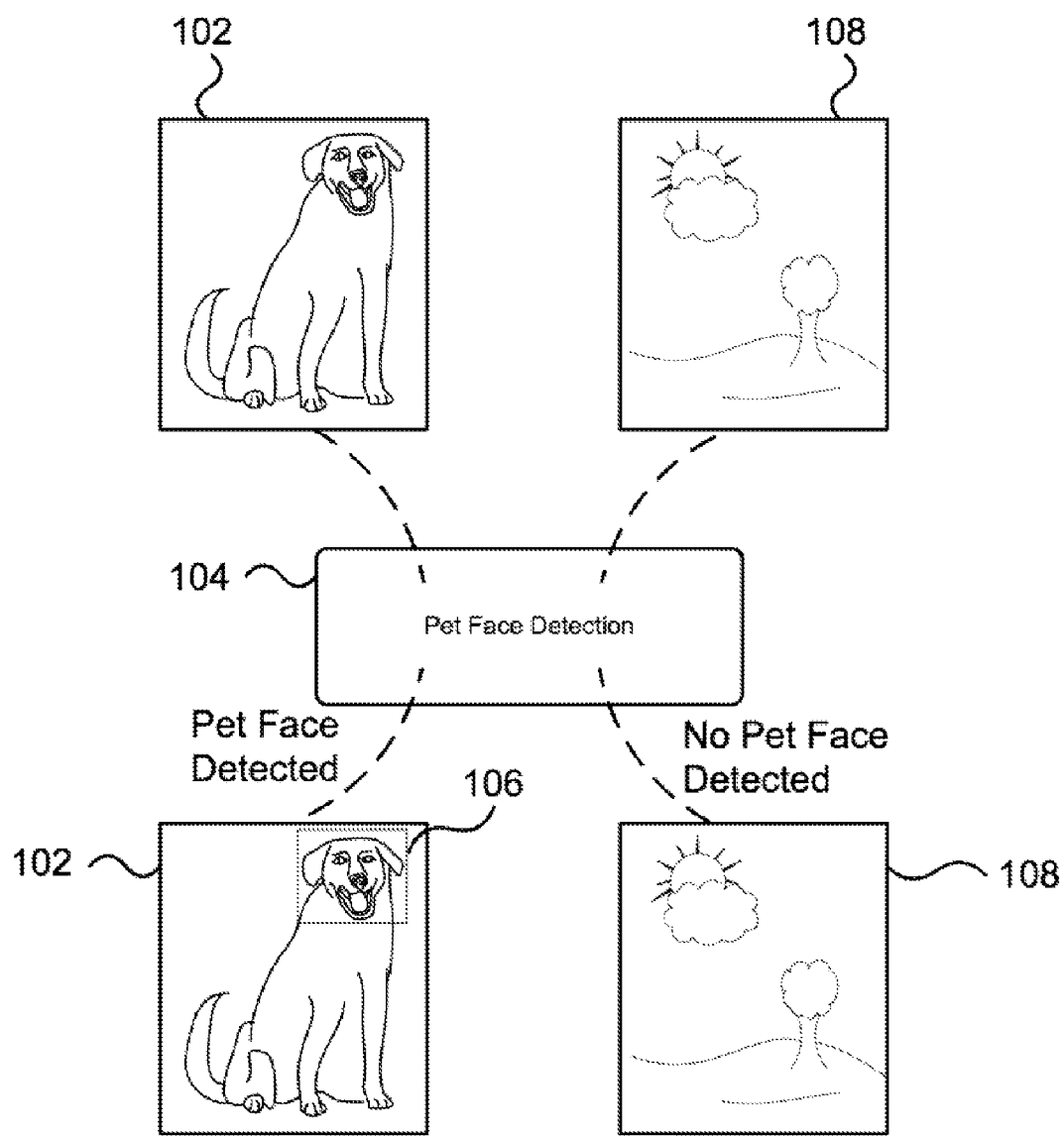
FIG. 1 depicts the detection of a pet's face in an image.

FIG. 1 depicts the detection of a pet's face in an image. As depicted, an image 102 that has a pet's face in it can be provided to pet face detection functionality 104. As described further herein, the pet face detection functionality 104 processes the image and identifies the location of the pet's face within the image 102. The location of the pet's face can be indicated in various ways. The location is depicted as being indicated using a rectangular box 106 surrounding the detected face. In addition to identifying the location of the pet's face, the processing may also identify the location of facial components such as eye, nose and/or mouth locations. As depicted in FIG. 1, images that do not have a pet's face, such as image 108 can be provided to the pet face detection functionality 104; however, it will not detect the presence of a pet's face.

As described further below, the pet face detection functionality 104 is trained to detect pet faces using images of pets that have been associated with a particular category ID (identification). The pet face detection functionality 104 utilizes a number of cascade classifiers that are each trained to detect pet faces in a particular category. The combined cascade classifiers are able to detect faces of pets with high diversity among the visual characteristics across breeds.

Figure 2:
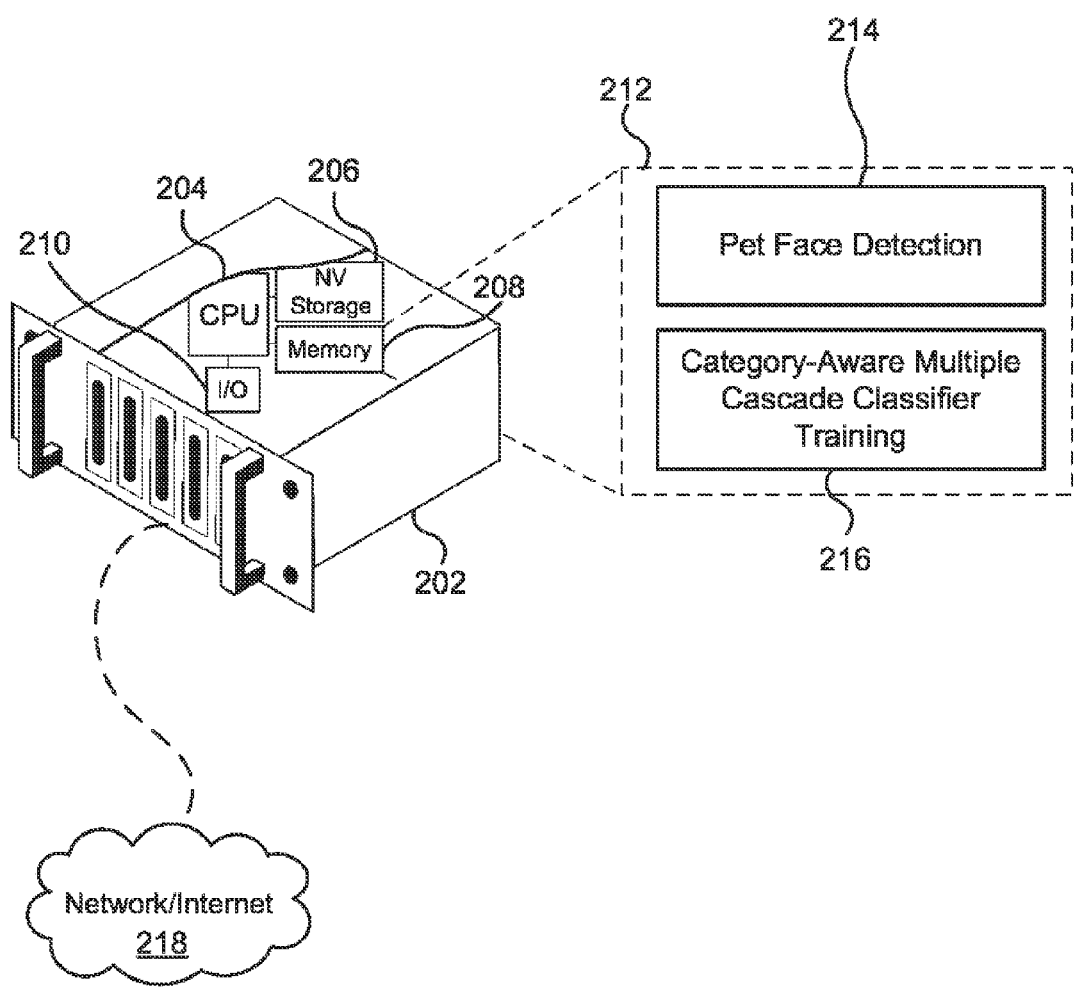
FIG. 2 depicts a system for implementing pet face detection functionality and training functionality for training components of the pet face detection functionality.

FIG. 2 depicts a system for implementing pet face detection functionality and training functionality for training components of the pet face detection functionality. As depicted, the system 202 comprises a central processing unit 204 for executing instructions. The system 202 may further comprise non-volatile (NV) storage for storing data and instructions in a non-volatile memory. The system 202 may further include a memory unit 208 that stores data and instructions for execution by the processing unit 204. The instructions and data stored in the memory unit 208 may be loaded from the non-volatile storage 206 and/or may be provided from other sources such as external components.

The instructions stored in the memory unit 208 may be executed by the processing unit 204 in order to configure the system 202 to provide various functionalities 212, including the pet face detection functionality 214 and category-aware multiple cascade classifier training 216. The system 202 may further comprise an input/output (I/O) interface 210 that can connect the system 202 to other components, including for example a network interface for connecting to a network and/or the Internet 218, a keyboard, a mouse or pointing device, a monitor, a camera and/or other devices.

Although the above has depicted the pet face detection functionality 214 and the category-aware multiple cascade classifier training functionality 216 as being provided by a single physical system, it is contemplated that the functionality may be provided by separate systems. For example, a first system may provide training functionality in order to train the pet face detection functionality, which may be subsequently loaded onto a second system for performing the pet face detection on images. Further, the system 202, or any system implementing the functionality 214, 216 may be provided as a number of physical or virtual servers or systems co-operating to provide required or desired processing loads, backup as well as redundancy. Further, although depicted as being provided in a computer server device, it is contemplated that the pet face detection functionality 214, and possibly the training functionality 216 may be provided in other computing devices including for example personal computers, laptops, tablets and/or smartphones. Further still, the pet face detection functionality 214, and possibly the training functionality 216 may be provided in other devices, including, for example robotics, automotive vehicles, aviation vehicles or other devices that include a vision system that could benefit from detecting the presence of a pet's face in an image.

Figure 3:
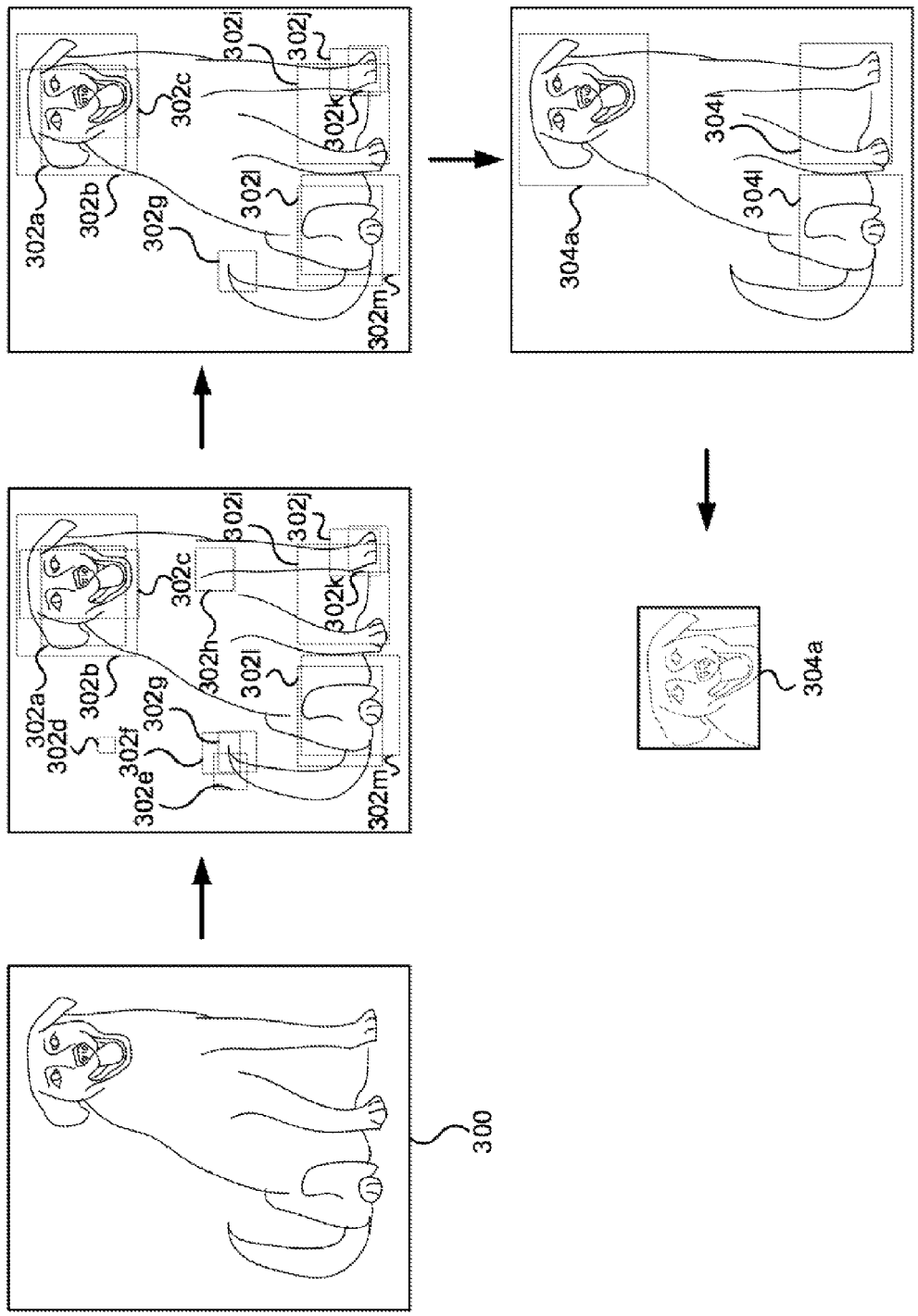
FIG. 3 provides an overview of the image processing for the pet face detection functionality.

FIG. 3 provides an overview of the image processing for the pet face detection functionality. An image 300 is received and processed to identify a number of potential pet face location windows 302a-302m. The initial processing may be performed by a global cascade classifier that is trained to detect pet faces in all different categories of the pet type. The global cascade classifier that performs the initial potential location window detection may be trained to detect pet faces with a high detection rate, that is it will detect all potential locations with a pet face, but a high false-positive rate, that is many of the detected potential locations will not actually have a pet face present. For example, in one embodiment, a high detection rate may be a detection rate with an accuracy of over 85%, meaning that 85% or more of the pet faces are detected. A high false-positive rate may be considered, in one embodiment, to mean that over 15% of the potential locations that are detected are false-positives.

After the initial pet face location windows are determined, the location windows 302a-302m are further processed in order to lower the false-positive rate. As described further, processing of the location windows 302a-302m may be performed by a multiple cascade classifier. The multiple cascade classifier comprises a number of category-aware cascade classifiers that are each trained to detect pet faces in a respective category with a low false-positive rate. Each of the category aware cascade classifiers process negative windows from the previous category aware classifier. After processing the window locations 302a-302m, a number of the location windows will be rejected as having no pet face present. The remaining location windows 302a-302c, 302g, 302i-m are locations that may be considered as likely to have a pet face; however, a number of the location windows may be detecting the same feature or may be detecting non-face features as a pet face. The remaining location windows are further processed in order to remove outliers and to merge overlapping location windows. After removing outliers and merging windows, a number of potential pet face windows may remain 304a, 304i, 304l. It is noted that while the remaining location windows 304a, 304i, 304l are similar to the location windows 302a, 302i, 302l, they may represent a number of merged location windows and as such may differ in size and location from a single one of the previously detected location windows 302a, 302i, 302l. The remaining location windows 304a, 304i, 304l are further processed in order to verify the presence of facial components, such as eyes, nose and mouth, in the location window. As depicted in FIG. 3, only a single one of the window locations, namely 304a, is verified as having facial components present and as such, the window location 304a may be returned as a location of a pet's face. It will be appreciated that although the above has described detecting a single pet's face, the same process may be used to detect multiple pet faces in a single image. Further, in addition to returning the location window with the pet's face, it is possible to determine the location of the facial components, such as eyes and nose, within the location window.

Figure 4:
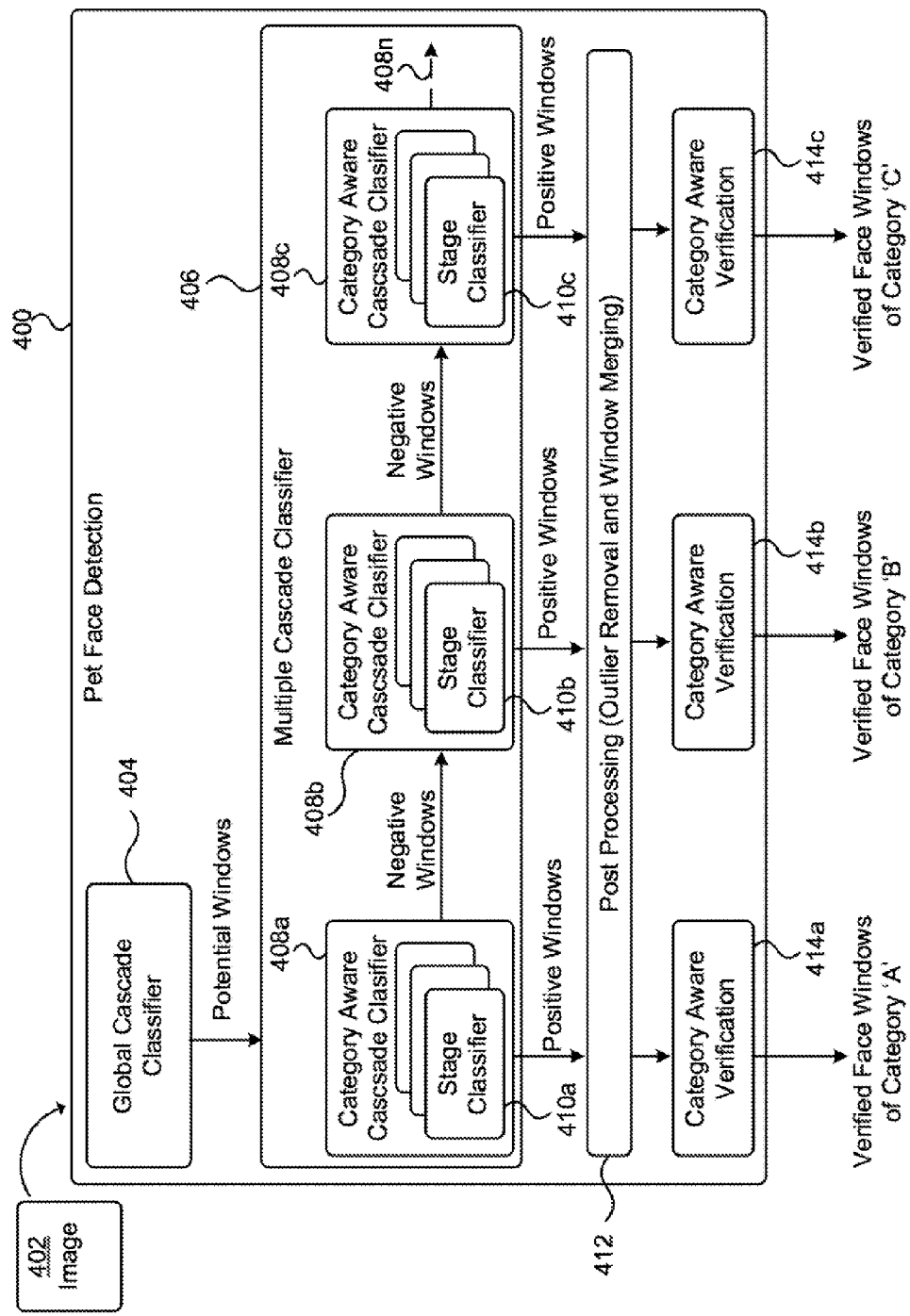
FIG. 4 depicts logical components of the pet face detection functionality.

FIG. 4 depicts logical components of the pet face detection functionality. The pet face detection functionality 400 may be implemented in a number of physical systems, such as system 202 described above. An image 402 is received by the pet face detection functionality 400 and is initially processed by a global cascade classifier 404. The global cascade classifier 404 may also be referred to as a coarse cascade classifier as its primary function is to identify all possible locations within the image in which a pet face may be located. The global cascade classifier scans the image to generate all possible windows of different sizes and locations and then processes each of the possible windows to identify those windows that potentially contain a pet face. The global cascade classifier may be a classifier trained on a set of images of all different categories of pets; however, the global cascade classifier is trained to have a high false positive rate. Accordingly, the potential windows identified by the global cascade classifier will include the possible windows that include a pet's face as well as a number of windows that do not actually include a pet's face.

The potential windows initially identified by the global cascade classifier 404 are further processed by a multiple cascade classifier 406. The multiple cascade classifier 406 processes the potential windows in order to filter the potential windows in order to remove a large number of the false positive windows identified by the global cascade classifier 404. The multiple cascade classifier 406 comprises a number of category aware cascade classifiers 408a, 408b, 408c. Although three category aware cascade classifiers are depicted, it is possible for the multiple cascade classifier to utilize only two category aware cascade classifiers. Further, it is possible for the multiple cascade classifier to utilize more than three category aware cascade classifiers as depicted by dashed line 408n. The potential windows are processed by a first one of the category aware cascade classifiers 408a, which will identify a number of the potential windows as either positive windows or negative windows. Positive windows are those potential windows that the category aware cascade classifier identifies as having a pet face present. Negative windows are potential windows that the category aware cascade classifier has not identified as having a pet face present. The negative windows from the first category aware cascade classifier are processed by a second category aware cascade classifier 408b. Again the second cascade classifier 408b will identify a number of positive windows and negative windows from the negative windows of the first category aware cascade classifier 408a. If a third category aware cascade classifier 408c is present, as depicted in FIG. 4, the negative windows from the second category aware cascade classifier 408b are processed to again identify positive windows and negative windows. The negative windows from the third category aware cascade classifier may be processed by subsequent category aware cascade classifiers in the same way until there are no more category aware cascade classifiers.

Each of the category aware cascade classifiers 408a-408c is trained to identify pet faces of a particular category. When training a category aware cascade classifier, training set images are associated with a category that groups together similar breeds of pets based on their visual characteristics. As an example, the first category aware cascade classifier may be trained to identify pet faces of dogs such as Chihuahuas and Italian greyhounds, the second category aware cascade classifier may be trained to identify pet faces of dogs such as border collies and English springer, and the third category aware cascade classifier may be trained to identify pet faces of dogs such as bassets and beagles. Each of the category aware cascade classifiers 408a-408c may include a number of stage classifiers 410a-410c, which may be trained based on a cascaded adaboost algorithm. Although each of the stage classifiers for a particular category may only be slightly better than chance at detecting a pet's face within the category, the combination of a number of the stage classifiers can provide an overall classifier that is able to satisfy a desired detection rate of the respective category.

Following the processing of potential windows by the multiple cascade classifier 406, the identified positive windows may be processed by post processing functionality 412 in order to remove outliers and to merge positive windows that overlap with each other.

The positive windows identified by each category aware cascade classifiers 408*a*-408*c* may then be verified by respective category aware verification functionality 414*a*-414*c* to further reduce false positives from the multiple cascade classifier 406. The verification functionality verifies, or attempts to verify, the presence of facial components, namely eyes and nose and possibly mouth, within the window. If a window contains eyes and nose with a high score, then the window may be considered as highly probable to contain a pet's face. The windows that are verified as having a pet's facial components may be returned and further processed in accordance with a desired application.

Figure 5:
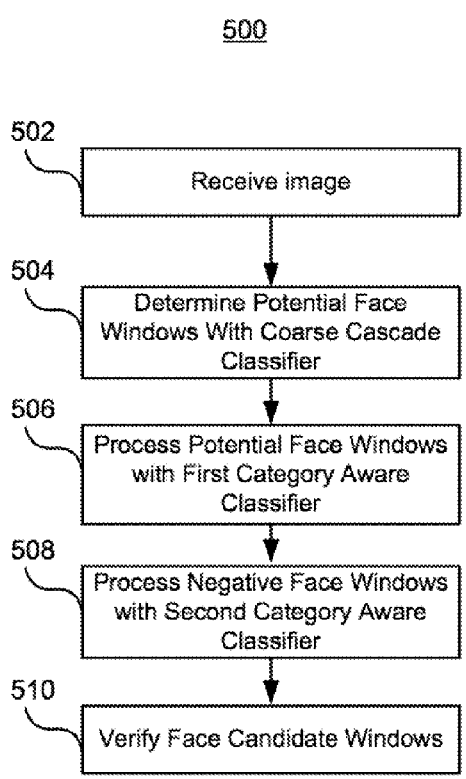
FIG. 5 depicts a method for detecting pet faces within an image.

FIG. 5 depicts a method for detecting pet faces within an image. The method 500 begins with receiving an image (502). It is assumed that the image includes at least one pet's face. The method determines a number of potential location windows using a coarse cascade classifier (504) trained to detect possible pet faces across all breed categories. The coarse cascade classifier is trained to provide a high detection rate with a high false positive rate, and as such a number of the determined potential location windows will not in fact contain a pet's face. However, assuming that the image contains a pet's face, the face will be within at least one of the determined potential location windows. Once the potential windows are identified using the coarse cascade classifier, the potential windows are processed with a first category aware classifier (506). The first category aware classifier is trained on a set of pet images that are each associated with a first category. The processing by the first category-aware cascade classifier identifies zero or more of the plurality of potential face location windows as potentially having a pet face present. The negative windows from the first category aware classifier, that is the windows that are not identified as having a pet face present, are then processed by a second category aware classifier (508) trained on a set of images associated with a second category. The positive windows identified by each of the category aware classifiers are then verified (510) as having facial components present in order to reduce false positives.

Figure 6:
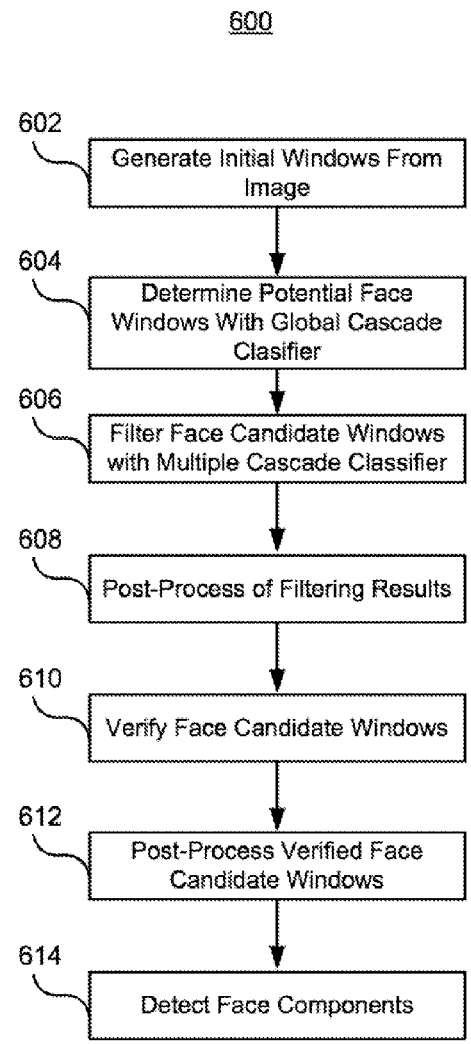
FIG. 6 depicts a further method for detecting pet faces within an image.

FIG. 6 depicts a further method for detecting pet faces within an image. The method 600 begins with generating initial windows from a received image (602). The initial windows may be generated by scanning the received image from, for example, the top left to the bottom right with different window sizes. Each of the initial windows is classified using a global cascade classifier (604) in order to generate candidate windows that potentially have a pet's face present. The global category classifier identifies windows with potential pet's faces present with a high false positive rate. The global category classifier may be trained using a conventional cascaded adaboost algorithm. Once the initial windows are processed by the global cascade classifier in order to identify windows that potentially have a pet's face present, potential windows are further filtered by processing by a multiple cascade classifier (606) in order to reduce the false positive rate of the initial classification by the global category classifier. The positive windows identified by the multiple cascade classifier may be post-processed (608) in order to remove outliers based on a scoring of the potential windows. The post-processing may also merge together highly overlapping windows in order to avoid multiple windows for a single pet's face. The post-processed candidate windows may be verified (610), for example using component classifiers, in order to ensure that facial components are present in the window. The windows that are verified to have facial components may be post-processed again (612) to remove any outliers and merge overlapping windows. Once the verified windows have been post-processed, the facial components in the windows may be detected (614) and their location returned.

Figure 7:
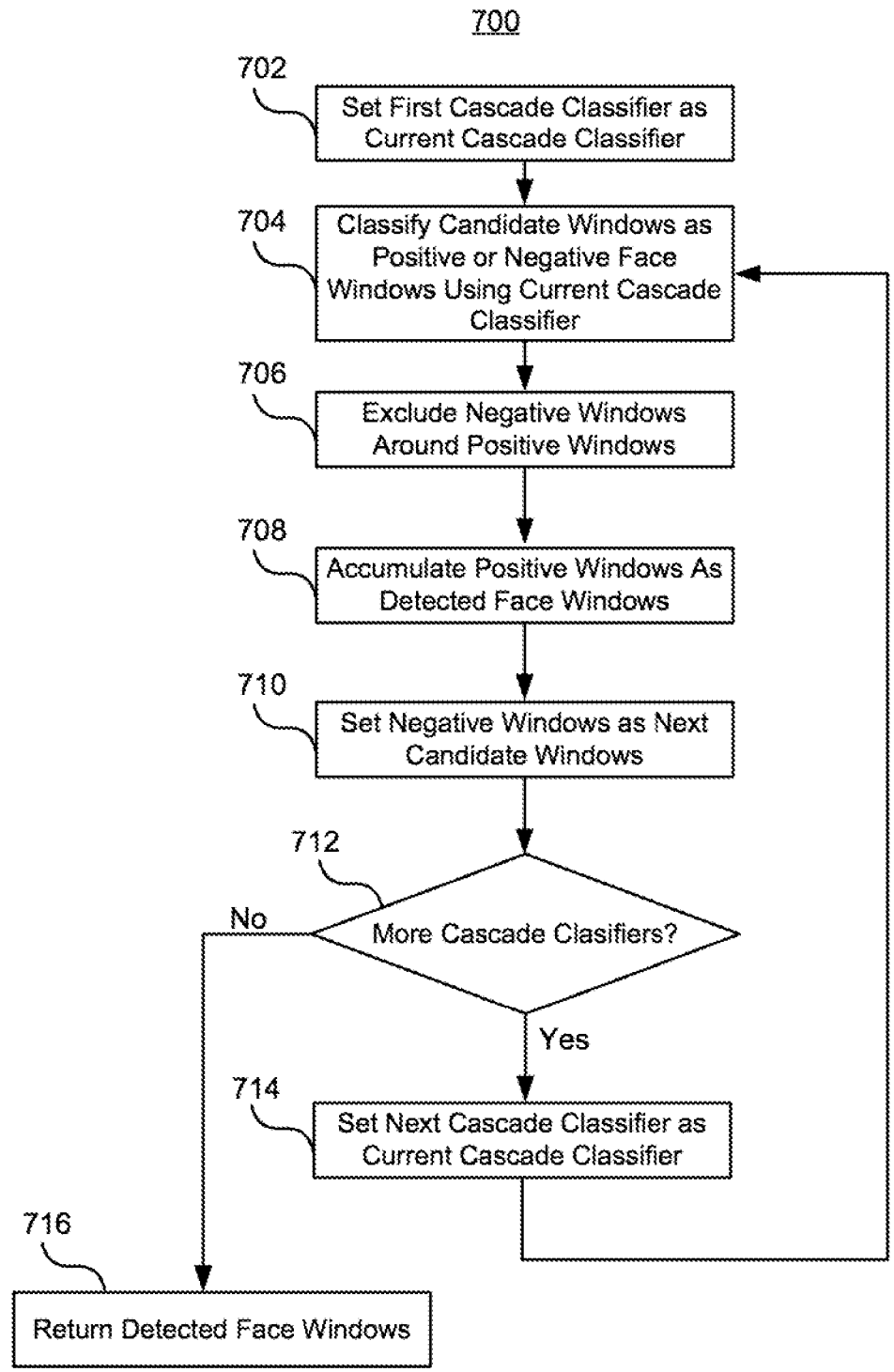
FIG. 7 depicts a method of detecting pet faces using a multiple cascade classifier.

FIG. 7 depicts a method of detecting pet faces using a multiple cascade classifier. As described above, a multiple cascade classifier may be used to further filter candidate windows identified by the global cascade classifier. The multiple cascade classifier has a number of category aware cascade classifiers. The multiple cascade classifier processes each of the potential windows by setting a first one of the category aware cascade classifiers as the current cascade classifier (702). The current category aware cascade classifier is used to classify the potential windows as either a positive or negative window (704). After classifying the positive and negative windows, negative windows surrounding the positive windows are excluded (706) from further processing in order to reduce potential redundant classification. The positive windows detected by the current cascade classifier are accumulated with previously detected positive windows (708). The remaining negative windows are selected as the next potential windows that will be processed by the classifier. The method determines if there are more category aware cascade classifiers for processing the potential windows (712) and if there are (Yes at 712) the next category aware cascade classifier is set as the current cascade classifier (714) and used to classify the remaining potential windows (704). If there are no more category aware cascade classifiers for processing (No at 712), the accumulated positive windows are returned as the detected potential face windows. As described above with reference to FIG. 6, the detected potential face windows may be post-processed in order to remove outliers and merge overlapping windows.

FIG. 8 depicts a method of post processing potential windows. The method 800 post-processes potential face windows. Outliers are removed from the potential face windows (802). The outliers may be removed based on a predetermined threshold for the weighted sum of errors of a cascade classifier that may be empirically determined by testing different values on a test set of windows to determine a value that will remove outliers that are likely not to have a pet face present while not removing windows that are likely to have a pet face present. Once initial outliers are removed, the remaining windows may be merged (804). Windows may be merged together if there is significant overlap between the windows. The amount of overlap required in order to merge windows may vary depending on various factors. For example, requiring a lower amount of overlap will result in more windows being merged together, resulting in reduced subsequent processing. However, the lower overlap may result in windows representing two separate pet faces being merged together resulting in possibly missing the detection of one of the pet faces. Accordingly, the level of overlap required may depend, on at least, an acceptable failed classification rate. Once the windows are merged together, the windows may be again processed to remove outliers using the predetermined threshold (806). As described above with reference to FIG. 6, once the candidate windows are post-processed, the remaining windows are verified to remove those windows that do not include individual facial components.

FIG. 9 depicts a method of verifying the presence of facial components within a window. The verification is done per category label corresponding to the category aware cascade classifier that detected the pet face in the respective window. As described further below, both cascaded classifiers and support vector machine (SVM) regression may both be used for the component verification. The method 900 detects facial components, including eyes and nose, within each of the potential windows (902). Each of the components is detected using a respective cascade classifier trained to detect the facial component within the particular category. Once the facial components are detected, a component score is calculated for each window from the detected facial components (904). The component score provides an indication of the quality of the detected facial components and may be calculated by averaging the scores of the individual facial components within respective windows. The potential windows with a component score above a dynamic threshold are selected (906). The dynamic threshold may be determined by multiplying the highest component score by a ratio. Accordingly, the windows with relatively high component scores compared to the highest components score are selected. SVM regression is performed on each of the selected windows (908). A final face score is calculated as a weighted sum of the component score and the SVM regression score (910). The respective weights corresponding to the component score and regression score may be defined empirically in order to provide acceptable results. The selected potential windows may be further filtered by comparing the calculated final score to a dynamic threshold, which may be determined by multiplying the highest component score by a ratio. After the verification process, the remaining windows with a final score above the dynamic threshold are those windows that are determined to have a pet face present.

Figure 10:
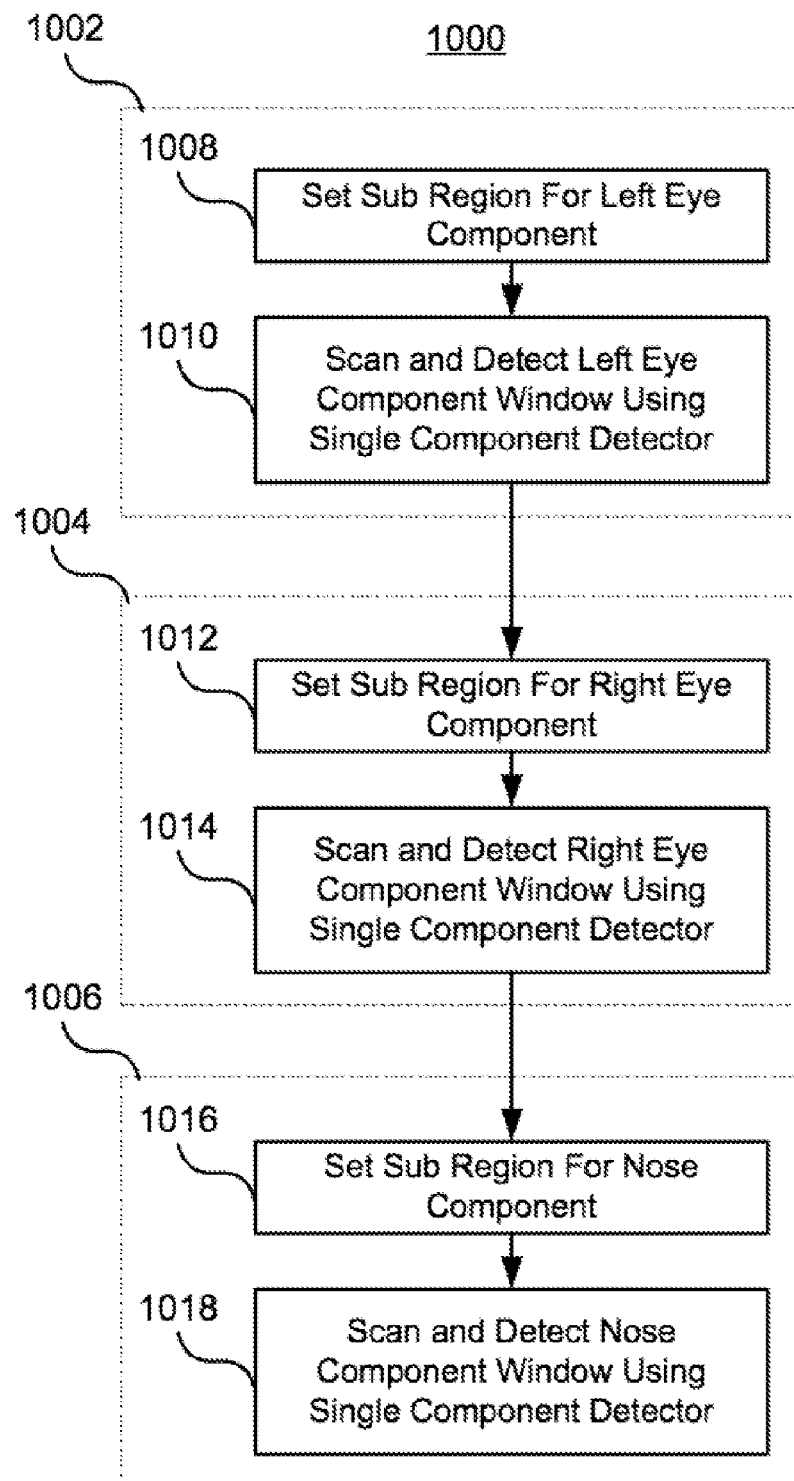
FIG. 10 depicts a method of locating facial components.

FIG. 10 depicts a method of locating facial components. As described above, the potential windows are processed in order to verify that facial components are present. In order to do so, the facial components are first detected. As depicted in FIG. 10, the method 1000 includes detecting a left eye (1002), detecting a right eye (1004), and detecting a nose (1006). When detecting a left eye facial component, a sub region for the left eye component is set (1008). The left eye sub region may be, for example the top-right corner of the window. The sub region is then scanned using a single component detector that is trained to detect the left eye (1010). When detecting a right eye facial component, a sub region for the right eye component is set (1012). The right eye sub region may be, for example, the top-left corner of the window. The sub region is then scanned using a single component detector that is trained to detect the right eye (1014). When detecting a nose facial component, a sub region for the nose component is set (1016). The nose sub region may be, for example the middle portion of the window. The sub region is then scanned using a single component detector that is trained to detect the nose (1018).

Figure 11:
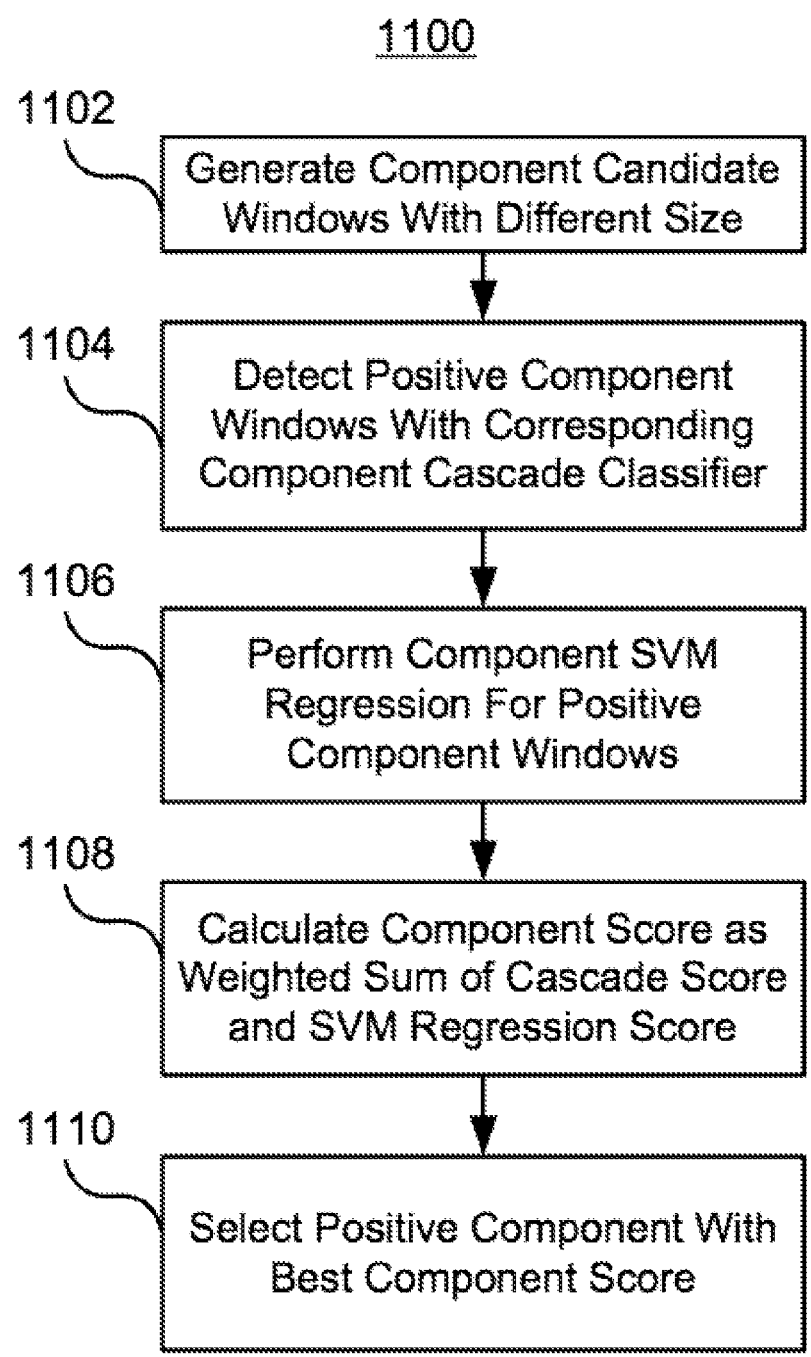
FIG. 11 depicts a method of detecting a single facial component.

FIG. 11 depicts a method of detecting a single facial component. The method 1100 may be used to detect the different facial components including the left eye, right eye, and nose when locating the facial components in a window as described above with reference to FIG. 10. The method 1100 begins with generating initial candidate sub-windows of different sizes (1102) from the sub regions. The initial candidate sub-windows are processed using a corresponding component cascade classifier (1104) in order to detect positive sub-windows in which the facial component was detected. The component cascade classifier used in the processing depends upon what facial component is being detected. For example, when detecting a left eye, a component cascade classifier trained to detect a left eye is used. The positive sub-windows are processed by performing component SVM regression (1106) in order to determine a quality of the detected facial component. A component score for each of the positive windows is determined as a weighted sum of the cascade score and the SVM regression score (1108). Finally, sub-window with the best component score is returned as the located facial component (1110).

As described above, images may be processed by a combination of a global cascade classifier and a multiple cascade classifier. The classified images may then be verified in order to determine a location of a pet's face within the image. In order for the classifiers to be able to successfully identify the pet's face, it is necessary to train the classifiers on a set of images. The training process may also be used to generate classifiers used to detect facial components. The training process is described further below with reference to FIGS. 12 to FIG. 16.

Figure 12:
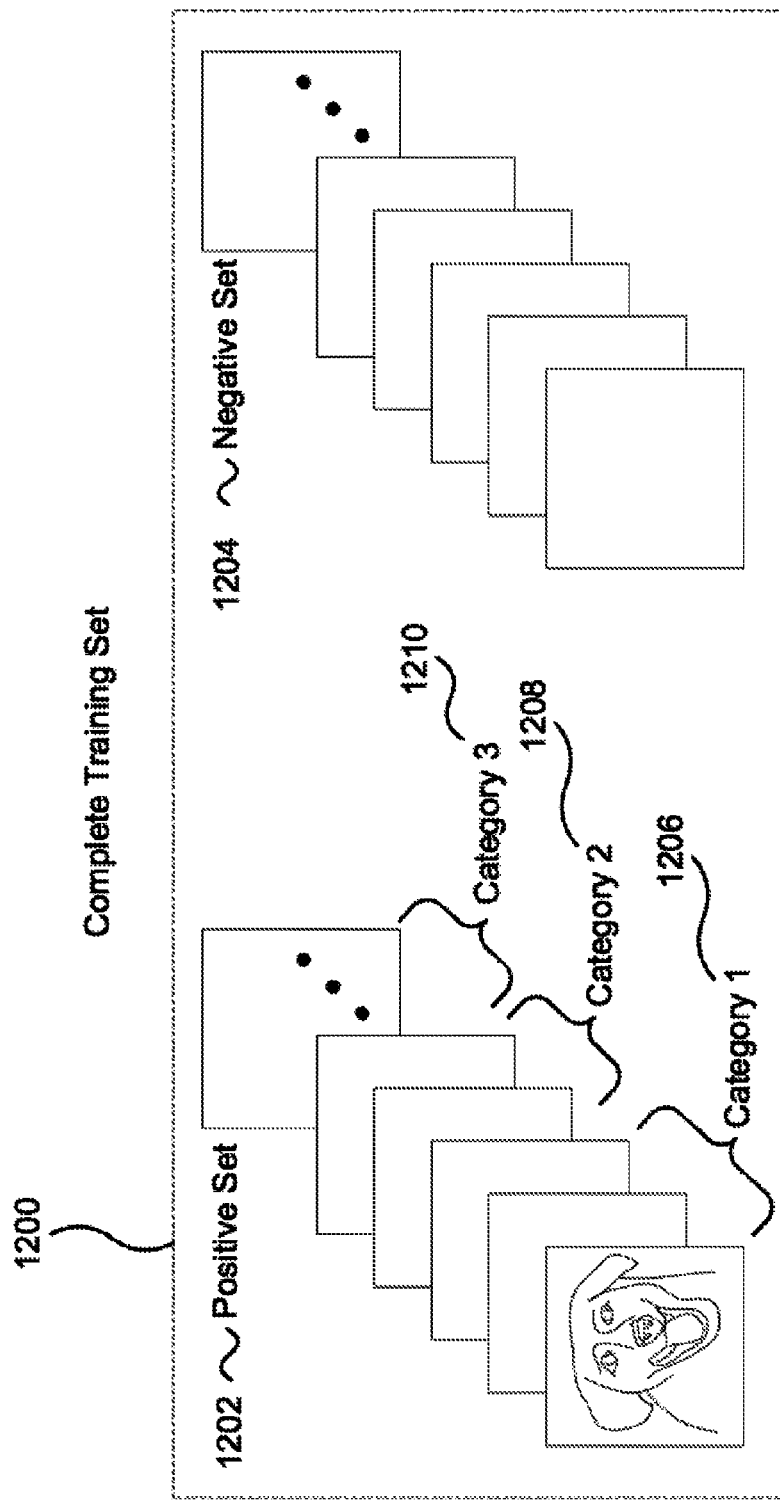
FIG. 12 depicts a set of training images.

FIG. 12 depicts a set of training images. The training set 1200 comprises a number of images in two main categories, namely a positive set of images 1202 which all have at least one pet's face present and a negative set of images 1204 which do not have a pet's face present. The positive set of images 1202 are grouped into a number of categories 1206, 1208, 1210 based on the set of breeds, or visual characteristics of the pet face present. The grouping of categories can be done manually or using a clustering method such as k-means algorithm. The positive set of images 1202 is used to train the global cascade classifier described above. The global cascade classifier is trained using a cascaded adaboost algorithm. In the standard cascaded adaboost algorithm, a classifier is trained to have a high detection rate and a low false positive rate. In contrast, the current global cascade classifier is trained in order to have a high detection rate and a relatively high false positive rate instead of low false positive rate. By training the global cascade classifier using the entire positive set, the global cascade classifier is able to detect pet faces from across all category breeds. As described above, the multiple cascade classifier comprises a number of category aware classifiers, which are each associated with a particular category. Each of the category aware classifiers is trained using the respective training set 1206, 1208, 1210 associated with the particular category.

Figure 13:
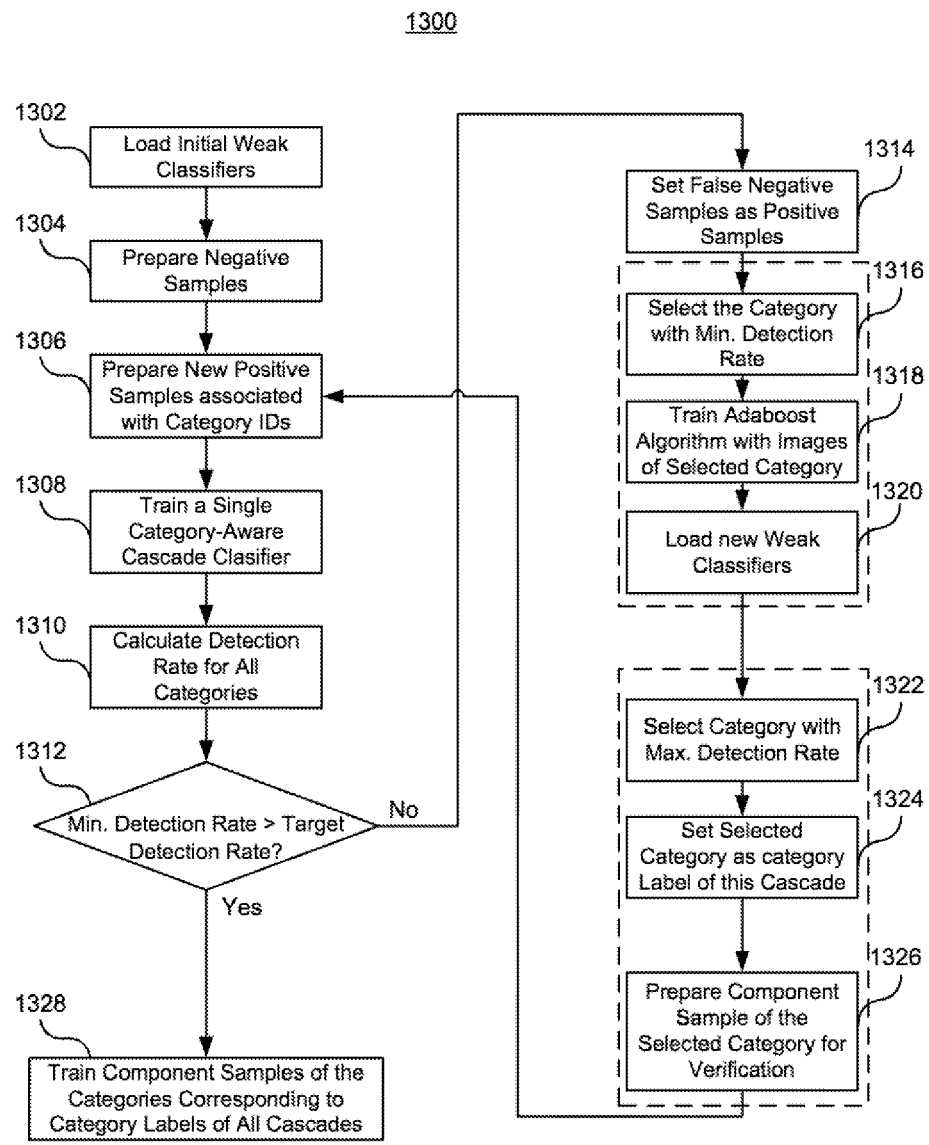
FIG. 13 depicts a method of training a multiple cascade classifier.

FIG. 13 depicts a method of training a multiple cascade classifier. The method 1300 begins with loading initial weak classifiers (1302) trained by conventional adaboost algorithm with positive samples associated with an initial category ID. The initial category ID may be determined by selecting a category which shows best detection rate with the global cascade classifier. A weak classifier is able to correctly classify an image at least better than chance. The negative image samples are prepared (1304) from the training set of images. The positive image samples are also prepared (1306). All positive samples are associated with corresponding category IDs. Positive samples from one or more similar breeds are associated with the category ID. The category IDs can be assigned to each image either manually, or using a clustering algorithm. Once the image samples are prepared, a single category aware cascade classifier is trained using the images (1308). The training of the category aware cascade classifier is described in further detail with reference to FIG. 14. Using the trained category aware classifier, the detection rates of all categories are calculated (1310) and it is determined whether the calculated minimum detection rate is greater than a target detection rate (1312). If the minimum detection rate is no greater than the target detection rate (No at 1312), the false negative samples incorrectly classified by the trained category aware cascade classifier are selected as new positive samples (1314) for the subsequent training, or re-training. The new positive samples are used to train the category aware cascade classifier using the adaboost algorithm. The category with the minimum detection rate is selected (1316) and the classifier is trained using the sample images associated with the category having the minimum detection rate in order to generate new weak classifiers (1318), which may then be loaded (1320) into the category aware cascade classifier.

The category with the maximum detection rate is selected (1322) and set as the category label of the current category-aware cascade classifier (1324). Component samples of the selected category are prepared (1326) for use in component verification for the particular category. The processing may then return to preparing new samples (1306) and training a new single category aware cascade classifier (1308). If it is determined that the minimum detection rate of the category aware cascade classifiers is greater than the target detection rate (Yes at 1312), the component samples corresponding to the category labels of the category aware cascade classifiers may then be trained using the cascaded adaboost algorithm and SVM regression for use in the verification process.

Figure 14:
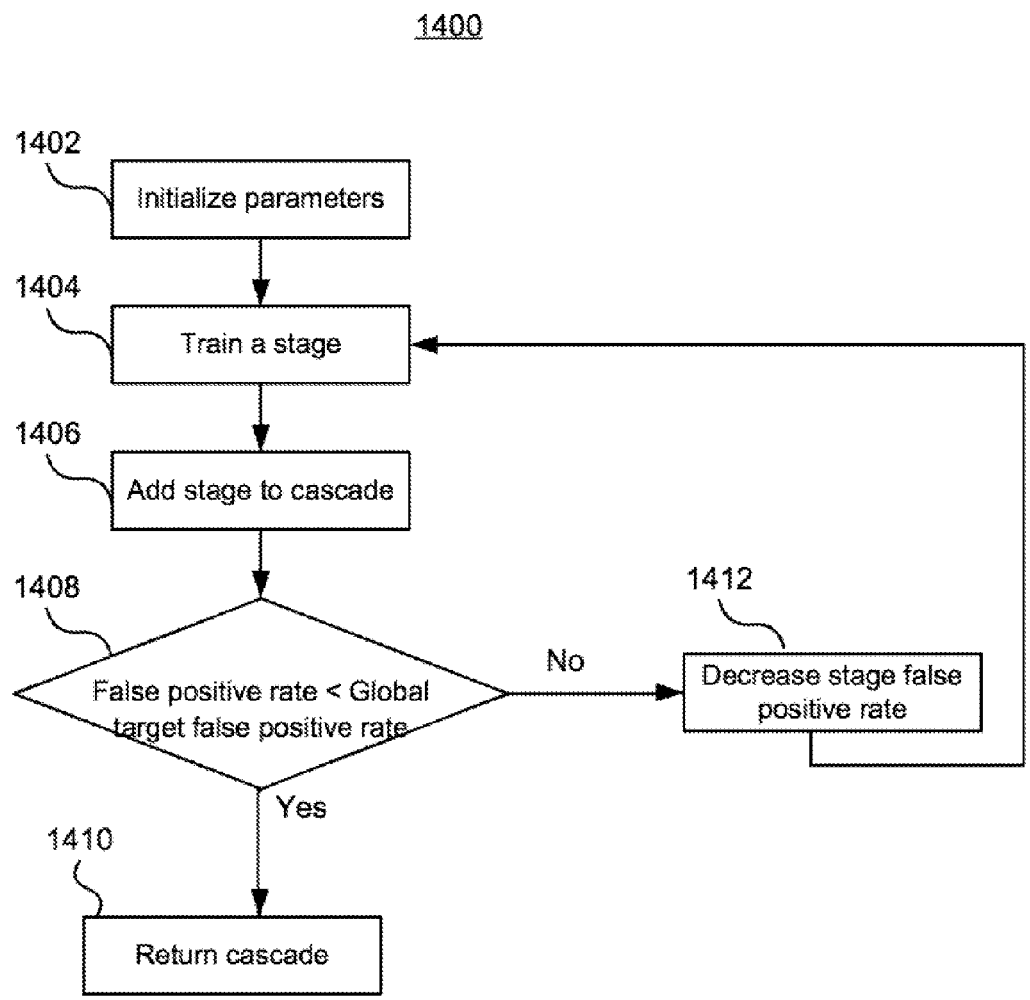
FIG. 14 depicts a method of training a single category-aware cascade classifier.

FIG. 14 depicts a method of training a single category-aware cascade classifier. The method 1400 begins with initializing parameters (1402), including a target detection rate, a global target false positive rate and a stage target false positive rate. A stage is trained (1404) with the target detection rate and stage target false positive rates. Training the stage is described in further detail in FIG. 15. The trained stage is added to the category aware cascade classifier (1406) and it is determined if the false positive rate of the category aware cascade classifier is less than the global target false positive rate (1408). If the false positive rate is less than the global target false positive rate (Yes at 1408), the training of the category aware cascade classifier is complete and the trained category aware cascade classifier can be returned (1410). If the false positive rate is not less than the global target false positive rate, the stage false positive rate is decreased (1412) and a new stage in the category aware cascade classifier is trained (1404) with the decreased stage false positive rate.

Figure 15:
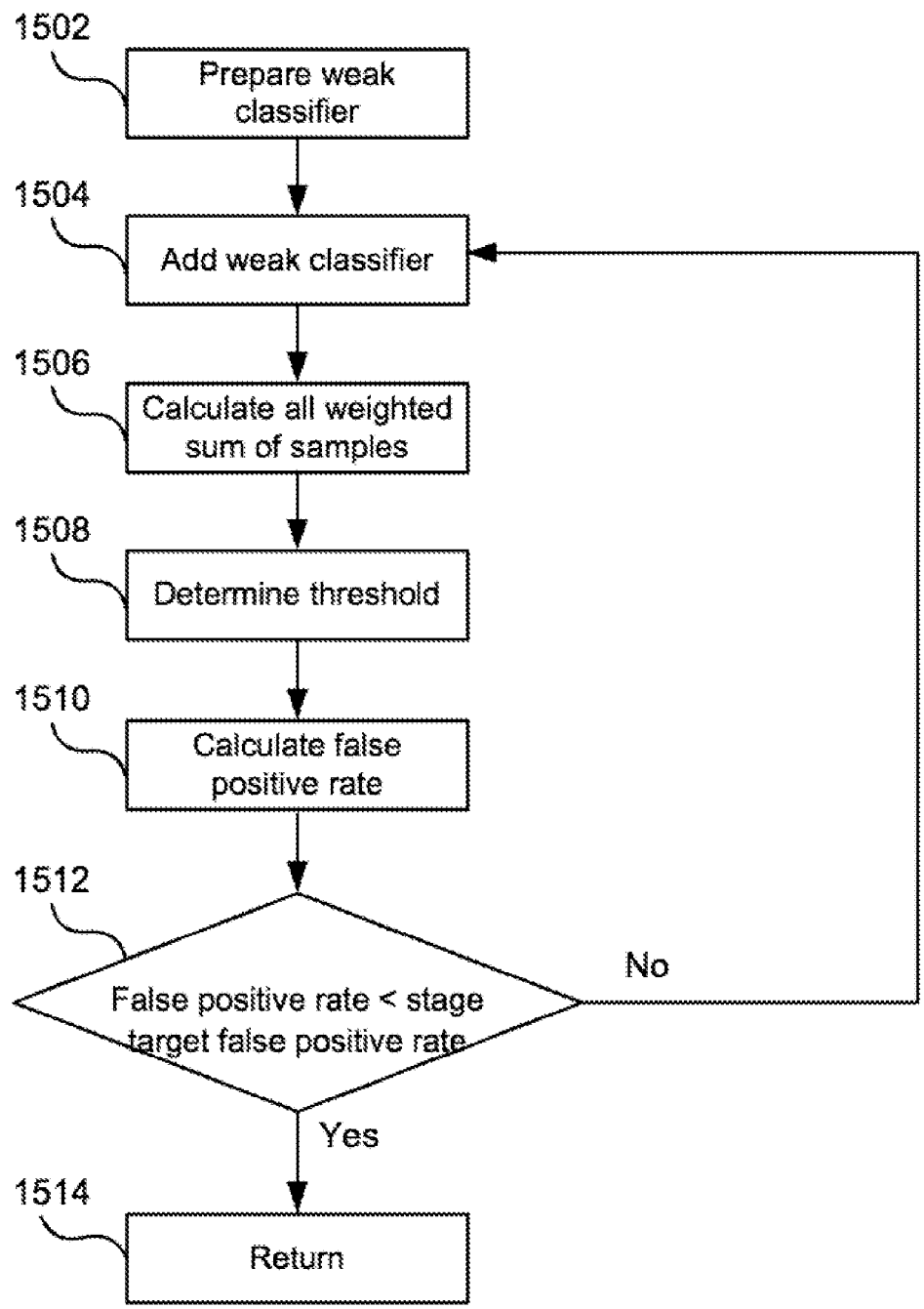
FIG. 15 depicts a method of training a category aware stage classifier.

FIG. 15 depicts a method of training a category aware stage classifier. The method is similar to that of the cascaded adaboost algorithm. Weak classifiers are prepared (1502) and added to the stage (1504). All weighted sum of samples are calculated (1506) using all of the weak classifiers. The threshold of the current stage is determined (1508) so that the detection rate of one of the categories satisfies the target detection rate. The false positive rate is determined (1510) based on the determined threshold and it is determined whether the false positive rate is less than the stage target false positive rate (1512). If the determined false positive rate is less than the stage target false positive rate (Yes at 1512), the stage is returned (1514). If the determined false positive rate is not less than the stage target false positive rate (No at 1512), a new weak classifier is added (1504) and the sums and threshold re-calculated.

Figure 16:
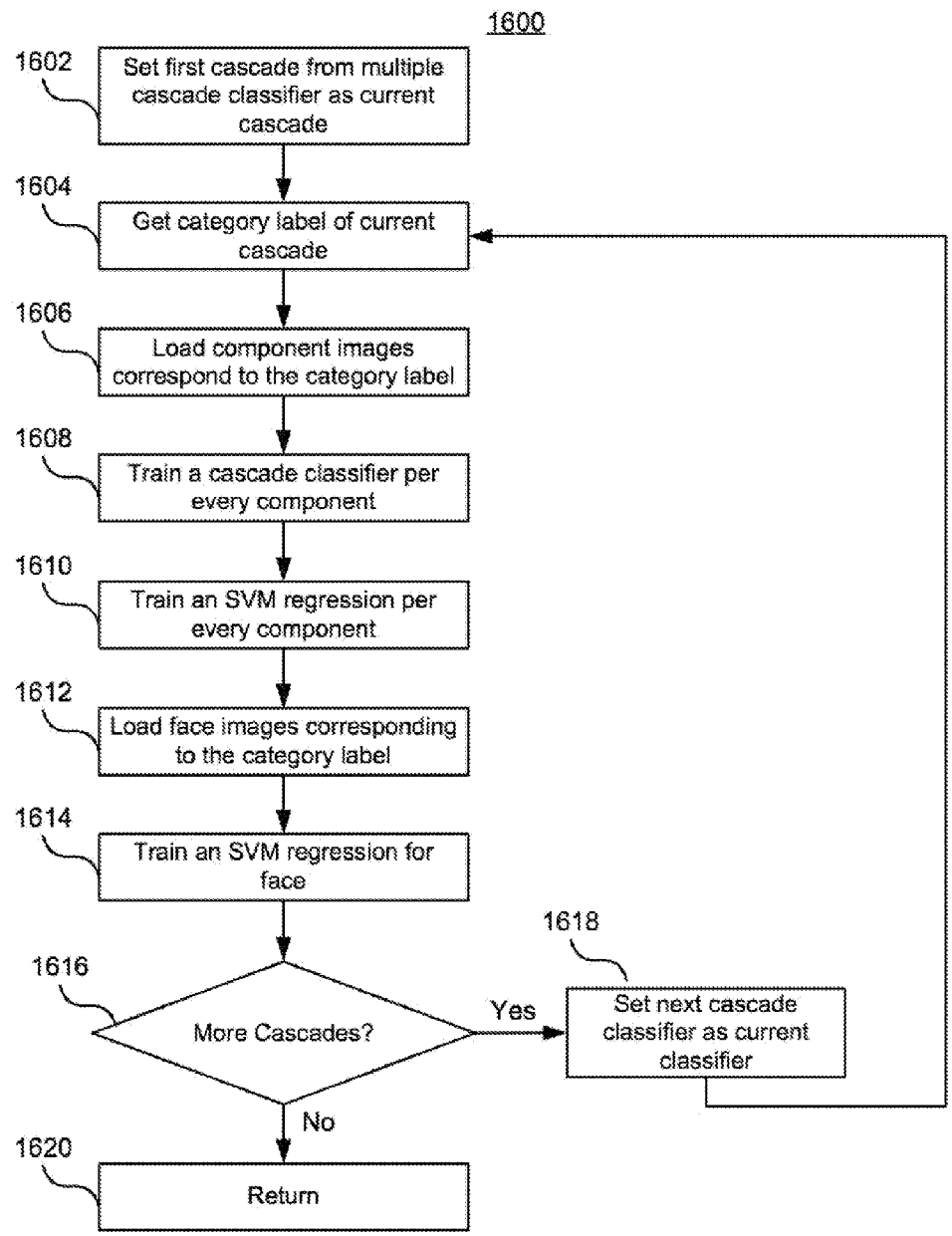
FIG. 16 depicts a method of training facial component detection for a category

FIG. 16 depicts a method of training facial component detection for a category. The first category aware cascade classifier is set as the current cascade classifier (1602). The category associated with the current cascade classifier is selected (1604) and used to load component images corresponding to the selected category (1606). A cascade classifier is trained for each facial component (1608) using the cascaded adaboost algorithm. The facial components are also used to train the SVM regression for each facial component (1610). Face images corresponding to the category are loaded (1612) and trained with SVM regression for the face (1614). It is determined if there are more cascade classifiers (1616), and if there are (Yes at 1616), the next cascade classifier is set as the current classifier (1618) and processed as described above by determining the category label associated with the current classifier (1620). If there are no more cascade classifiers (No at 1616), the method is completed and may return (1620).

The above has described both the training of classifiers for use in detecting pet faces as well as the detection of pet faces in images. The pet face detection may be used in a number of applications. As an example, the pet face detection may be used to identify the location of a pet's face in an image. The located pet's face may then be further processed for example to determine if it matches to a known pet image such as images of missing pets. Further, the pet face detection may be used in processing video to determine if a pet is present in the video, which may be useful in providing pet detection for home security applications. Further, the pet face detection functionality may be used in robotics to determine if a pet is located in the image or video, which may be used to control the behavior of the robot. Further still, the pet face detection may be used in order to tag pets in images. The pet detection functionality may be provided as an online service in which images may be submitted to the service and locations of the pet's face may be returned. Further, the pet detection functionality may be provided embedded within devices such as cameras, smartphones, laptops, personal computers etc. Other applications will be apparent to one of ordinary skill in the art.

Although specific embodiments are described herein, it will be appreciated that modifications may be made to the embodiments, including values of numerical parameters, without departing from the scope of the current teachings. Accordingly, the scope of the appended claims should not be limited by the specific embodiments set forth, but should be given the broadest interpretation consistent with the teachings of the description as a whole.

What is claimed is:

1. A method of detecting a pet's face in an image comprising:
  receiving an image with one or more pet faces;
  processing the received image using a coarse cascade classifier trained to detect pet faces with a high detection rate and high false positive rate, the coarse cascade classifier identifying a plurality of potential pet face location windows within the received image;
  processing the plurality of potential pet face location windows to determine if a pet face is present, the processing of the plurality of potential pet face location windows comprising:
    processing each of the plurality of potential pet face location windows with a first of a plurality of category-aware cascade classifiers trained on a set of pet images each associated with a first category, the processing by the first category-aware cascade classifier identifying zero or more of the plurality of potential face location windows as having a pet face present; and
    processing each of the potential pet face location windows not identified as having a pet face present with a second category-aware classifier trained on a second set of pet images associated with a second category, the processing by the second category-aware cascade classifier identifying zero or more of the potential face location windows as having a pet face present; and verifying the presence of a pet face in each of the potential pet face location windows identified as having a pet face present.

2. The method of claim 1, further comprising removing outliers of the potential pet face location windows prior to verifying the presence of a pet face in the respective potential pet face location window.

3. The method of claim 2, further comprising merging significantly overlapping potential pet face location windows prior to verifying the presence of a pet face in the respective potential pet face location window.

4. The method of claim 2, wherein outliers are identified using a predefined threshold for a weighted sum of errors.

5. The method of claim 1, wherein the presence of a pet face in each of the potential pet face location windows identified as having a pet face present is verified based on the category associated with the category-aware cascade classifiers used to identify the potential pet face location windows.

6. The method of claim 1, wherein the presence of a pet face in each of the potential pet face location windows identified as having a pet face present is verified by:

identifying facial components within the potential pet face location windows using a cascade classifier trained to identify facial components;

scoring a matching quality of each identified facial component;

determining an adaptive verification threshold based on a maximum matching quality score of respective potential pet face location windows multiplied by a weighting ratio; and determining identified facial components having a matching quality score above the adaptive verification threshold.

7. The method of claim 6, further comprising verifying the presence of a pet face in each of the potential pet face location windows using support vector machine (SVM) regression.

8. The method of claim 7, further comprising determining a final matching score for identified facial components based on the SVM regression and the matching quality score.

9. The method of claim 1, wherein the presence of a pet face in each of the potential pet face location windows identified as having a pet face present is verified using support vector machine (SVM) regression.

10. The method of claim 1, further comprising:

training the coarse cascade classifier on a set of training images comprising a plurality of images containing pet faces associated with respective categories and images containing no pet faces.

11. The method of claim 10, wherein the coarse cascade classifier is trained using a cascaded adaboost algorithm in order to provide the high detection rate and high false positive rate.

12. The method of claim 1, wherein the first and second category aware cascade classifiers are iteratively trained based on a modified cascaded adaboost algorithm using training images associated with the first and second categories respectively.

13. The method of claim 12, wherein the modified cascaded adaboost algorithm determines a threshold of a stage so that a detection rate of one of the categories satisfies a target detection rate.

14. The method of claim 13, wherein a category with the highest detection rate is selected as the category for a category aware classifier currently being trained.

15. The method of claim 1, wherein the plurality of potential pet face location windows are processed by a multiple cascade classifier comprising the first category aware cascade classifier and the second category aware cascade classifier.

16. The method of claim 1, wherein one or more additional category aware cascade classifiers, each trained on a set of pet images associated with a respective category, are further used to process the plurality of potential pet face location windows.

17. A system for detecting a pet's face in an image comprising:

a processing unit for executing instructions;

a memory unit for storing instructions, which when executed by the processing unit configure the system to:

receive an image with one or more pet faces;

process the received image using a coarse cascade classifier trained to detect pet faces with a high detection rate and high false positive rate, the coarse cascade classifier identifying a plurality of potential pet face location windows within the received image;

process the plurality of potential pet face location windows to determine if a pet face is present, the processing of the plurality of potential pet face location windows comprising:

processing each of the plurality of potential pet face location windows with a first of a plurality of category-aware cascade classifiers trained on a set of pet images each associated with a first category, the processing by the first category-aware cascade classifier identifying zero or more of the plurality of potential face location windows as having a pet face present; and processing each of the potential pet face location windows not identified as having a pet face present with a second category-aware classifier trained on a second set of pet images associated with a second category, the processing by the second category-aware cascade classifier identifying zero or more of the potential face location windows as having a pet face present; and verify the presence of a pet face in each of the potential pet face location windows identified as having a pet face present.

18. The system of claim 17, wherein the presence of a pet face in each of the potential pet face location windows identified as having a pet face present is verified by:

identifying facial components within the potential pet face location windows using a cascade classifier trained to identify facial components;

scoring a matching quality of each identified facial component;

determining an adaptive verification threshold based on a maximum matching quality score of respective potential pet face location windows multiplied by a weighting ratio; and determining identified facial components having a matching quality score above the adaptive verification threshold.

19. The system of claim 17, wherein the instructions further configure the system to:
    train the coarse cascade classifier on a set of training images comprising a plurality of images containing pet faces associated with respective categories and images containing no pet faces;
    wherein the coarse cascade classifier is trained using a cascaded adaboost algorithm in order to provide the high detection rate and high false positive rate.

20. A non-transitory computer readable medium storing instructions for execution by a processor to configure a system to:
    receive an image with one or more pet faces;
    process the received image using a coarse cascade classifier trained to detect pet faces with a high detection rate and high false positive rate, the coarse cascade classifier identifying a plurality of potential pet face location windows within the received image;
    process the plurality of potential pet face location windows to determine if a pet face is present, the processing of the plurality of potential pet face location windows comprising:
        processing each of the plurality of potential pet face location windows with a first of a plurality of category-aware cascade classifiers trained on a set of pet images each associated with a first category, the processing by the first category-aware cascade classifier identifying zero or more of the plurality of potential face location windows as having a pet face present; and
        processing each of the potential pet face location windows not identified as having a pet face present with a second category-aware classifier trained on a second set of pet images associated with a second category, the processing by the second category-aware cascade classifier identifying zero or more of the potential face location windows as having a pet face present; and
    verify the presence of a pet face in each of the potential pet face location windows identified as having a pet face present.

* * * * *